United States Patent [19]
Rackman

[11] Patent Number: 5,282,065
[45] Date of Patent: Jan. 25, 1994

[54] FACSIMILE MACHINE FOR PRINTING DOCUMENTS ALL WITH CORRESPONDING EDGES ALIGNED INDEPENDENT OF WHETHER INDIVIDUAL DOCUMENTS WERE TRANSMITTED TOP OR BOTTOM EDGE FIRST

[76] Inventor: Michael I. Rackman, 1710 Glenwood Ave., Brooklyn, N.Y. 11230

[21] Appl. No.: 972,611

[22] Filed: Nov. 6, 1992

[51] Int. Cl.$^5$ ............................................. H04N 1/413
[52] U.S. Cl. ..................................... 358/488; 358/400
[58] Field of Search ............... 358/400, 488, 403, 405, 358/401

[56] References Cited

U.S. PATENT DOCUMENTS

| | | | |
|---|---|---|---|
| 4,642,700 | 2/1987 | Ohta et al. | 358/488 |
| 5,132,808 | 7/1992 | Higuchi et al. | 358/488 |
| 5,191,438 | 3/1993 | Katsurada et al. | 358/488 |
| 5,202,744 | 4/1993 | Ishimitsu | 358/488 |

Primary Examiner—Stephen Brinich
Attorney, Agent, or Firm—Gottlieb, Rackman & Reisman

[57] ABSTRACT

A facsimile machine in which all received documents have their corresponding edges aligned. Incoming data is stored in memory. Character recognition software processes this data to determine whether the top or the bottom edge of a document was transmitted first. To print the document, data is read out of the memory in the order in which it was received, or in the reverse order, such that an "upside down" document is reoriented.

6 Claims, 1 Drawing Sheet

FACSIMILE MACHINE FOR PRINTING DOCUMENTS ALL WITH CORRESPONDING EDGES ALIGNED INDEPENDENT OF WHETHER INDIVIDUAL DOCUMENTS WERE TRANSMITTED TOP OR BOTTOM EDGE FIRST

This invention relates to machines, and more particularly to a facsimile machine for reorienting pages.

Facsimile technology is highly developed, and facsimile machines enjoy widespread use. The present invention is directed to solving what is a relatively mild annoyance. The problem has to do with the fact that when transmitting documents by facsimile, there is no uniformity among users in whether the top of a document is sent first as opposed to the bottom. While most people send the top first, many do not. At the receiving site, especially if a machine has been receiving transmissions all night, a person looking through a stack of received documents in the morning (for example, in an office where the first one in scans all of the received documents to see if there are any urgent matters) has to look at documents some of which are right side up and some of which are up side down.

It is an object of my invention to provide a facsimile machine in which all documents are oriented the same way, i.e., with their corresponding edges aligned. This means that any documents which come in the "wrong" way are reoriented so that the corresponding edges of all documents are aligned—tops with tops, and bottoms with bottoms.

The problem toward which the subject invention is directed is admittedly not a serious one, at least not serious enough to warrant a significant increase in the cost of a facsimile machine. It is therefore another object of my invention to accomplish the aforesaid reorientation at very low cost.

In accordance with the principles of my invention, document reorientation is controlled primarily through software, using known techniques (but for a totally different purpose), thus accomplishing the objective at an insignificant increased cost. Most facsimile machines are already equipped with sufficient memory to store data representative of a complete document. In my invention, the data representative of a received document is stored in memory. (The term "received document" is sometimes used herein to refer to data signals representative of the document.) Conventional image and character recognition software is then used for determining whether the document (i.e., data representing the document) came in top first or bottom first.

This is easily accomplished, for example, by using character recognition software to scan the document, as it is mapped in the memory, in two different ways—top down and left to right, and bottom up and right to left. One of the two scanning sequences will result in recognizable characters. (On the off chance that they both do, the one with more recognizable characters is the "winner.") The stored data is then read out of the memory and used to control the printer. If a document came in top edge first, then its data is read out in the same order. If the document came in bottom edge first, then the data is read out in reverse order. In either case, all documents are printed top edge first.

Further objects, features and advantages of my invention will become apparent upon consideration of the following detailed description in conjunction with the drawing, in which.

My invention is admittedly a marriage of two well-known technologies, those of facsimile machines and those of character recognizers. The latter are machines which scan a document, or data representing a document, and recognize characters. The output of such a scanner is a series of character codes which are then processed typically on a word processor. In other words, a present-day scanner has the intelligence to recognize characters just as a human being does—not as a collection of dots (the way a facsimile machine works), but rather as predefined groups of dots.

Representative image and character recognition systems are shown in U.S. Pat. Nos. 5,123,062, 5,131,053, 5,142,161 and 5,151,952. Representative facsimile machines are shown in U.S. Pat. Nos. 4,186,415, 4,225,888, 4,491,873, 4,710,951 and 5,021,890. Image and character recognition is typically effected under the control of software. A typical scanner of the type described often includes a mechanism for scanning a document, and then processing the resulting line scans. There is no need for additional mechanical equipment of this type in my invention because the arriving data is stored in memory just as it is stored in a memory by a scanner. In other words, the facsimile machine includes memory anyway, so the character recognition software can operate on the data which is already stored. The data is then read out of the memory in one of the two possible orders depending on whether the stored document is to be reoriented. No change in the hardware of a conventional facsimile machine is required. A typical facsimile machine is software controlled in the first place, so that the subject invention can be implemented simply by providing some additional software.

Figure 1:
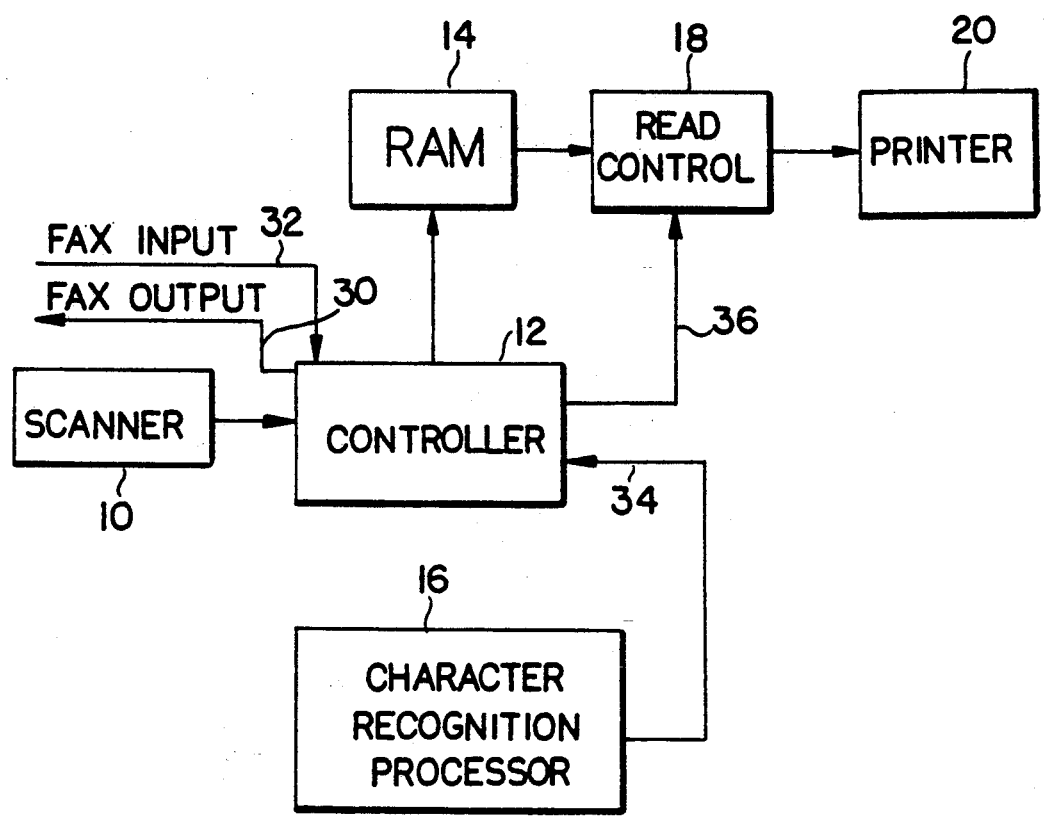
FIG. 1 depicts in block diagram form the illustrative embodiment of my invention.

In the system of FIG. 1, both transmitting and receiving functions are governed by controller 12, typically a microprocessor. A document to be transmitted is scanned by scanner 10, and controller 12 transmits the data over fax output line 20. The subject embodiment does not concern the transmit mode. (One day, there may be a standard by which the transmitter tells the receiver whether a document is being sent top first or bottom first, with a receiver then perhaps reorienting documents as appropriate.) The subject embodiment concerns operations in the receive mode, with data incoming over line 32.

Incoming data, or a representation of it, is stored in RAM memory 14. A typical fax machine has sufficient memory available to store a full page. (For example, if the same document is to be transmitted to many other machines, then rather than to scan it repetitively, the data can be stored in memory 14 and read out repetitively.) The data stored in RAM 14 is accessed by character recognition processor 16 through controller 12. Although shown as a separate processor, it is to be understood that the function of block 16 is accomplished by software, just as software governs the operation of controller 12. The character recognition processor determines whether an incoming document arrived top first or bottom first. Once that determination has been made, the controller is informed over line 34. The controller then causes the stored data to be read out of memory 14 by read control circuit 18. A command sent over line 36 controls reading to take place either in the same order in which data was stored, or in the reverse order, as will be described in connection with FIGS. 2 and 3. The data thus read is delivered to printer 20 which prints the document in a conventional manner.

It is thus apparent that the system of FIG. 1 utilizes the same hardware as is found in a present-day facsimile machine except for the addition of some software. The software, typically in the form of read only memory, can be provided at very little additional expense.

Figure 2:
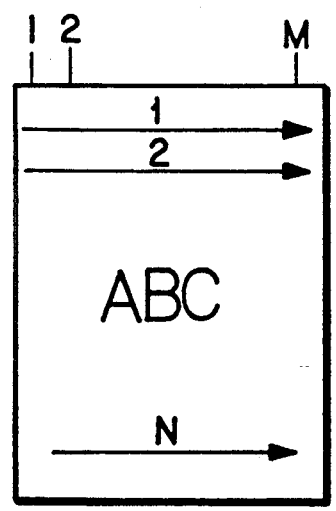
FIG. 2 depicts a first scanning order.

FIG. 2 shows a typical document which arrives top edge first. As shown, the document is scanned (at the transmitter which sends data to fax input line 32) from left to right, and top to bottom. Successive scan lines are numbered 1-N, and it is assumed that there are M pixels on each line numbered 1-M from left to right. The incoming data is processed and a representation of it is stored in memory 14 in the order in which it is received.

Figure 3:
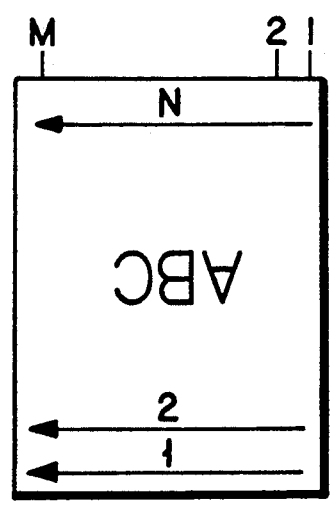
FIG. 3 depicts a second scanning order.

FIG. 3 shows an "up side down" document, with scanning taking place in the reverse direction. The scan lines are still numbered 1-N, but they now effectively scan the document from bottom to top and right to left. The two serial data streams which result from the scan sequences of FIGS. 2 and 3 are opposites of each other (first-to-last versus last-to-first) and, as depicted by the letters ABC, provide identical data streams if the two documents have opposite orientations.

Once the data is stored in memory from scanning of the type depicted in FIG. 2, if the data is read out in the same order, then the document will be oriented in the same way it was scanned by the original transmitter. If the top edge was transmitted first, it will be printed first. On the other hand, if the document is read from memory 14 in the reverse order, as shown in FIG. 3, then the last edge received will be printed first. This means that if the bottom edge was transmitted first, the top edge will be printed first. The net result is that all documents are oriented the same way in the output bin of the printer.

Let us assume that a document as shown in FIG. 2 is received over the fax input line 32. In other words, the transmitter sent the top first. When the character recognition processor scans the data in memory 14 in the same order and "recognizes" the letters ABC, it knows that by reading out the data in the same order in which it was received, the top edge of the document will be printed first.

On the other hand, suppose that the bottom edge was transmitted first. The data stored in memory 14, if mapped to the document, depicts the characters ABC upside down, as shown in FIG. 3. If the character recognition processor now scans the data in the memory in the reverse order, it will "recognize" the letters ABC and thus determine that the document was transmitted bottom edge first. What this means is that if the data is now read out of the memory in the reverse order, using the scanning sequence shown in FIG. 3, the top edge of the document will actually be printed first.

The question is how does the character recognition software know whether the data stored in the memory represents a document oriented as shown in FIG. 2 or a document oriented as shown in FIG. 3. That is a very simple matter. Using a brute force approach, the software can scan the data in the memory twice, once in the order shown in FIG. 2, and once in the order shown in FIG. 3. In one case characters will be recognized and in the other they won't. In those cases where there are actually some upside down characters on a page, it is simply a question of which scanning process gives rise to more recognizable characters.

It should be apparent, however, that it is really not necessary to scan the data representative of the entire document. It is sufficient to scan a small band. For example, the software may first detect "white" bands between lines of text. Thereafter, the software may scan the same band of text—a single line of characters—in the two directions depicted in FIGS. 2 and 3. One of the scans should result in far more recognizable characters than the other, and this determines the page orientation. In what would be the fastest scheme of all, a band of text could be scanned to recognize periods. Each period, since it is at the bottom of a line of text, is closer to one of the two white bands bounding a line of text than it is to the other. This in and of itself determines the page orientation. (Looking for an isolated dot may be fast, but it is hardly accurate. However, if a mistake is made, the worst that happens is that one page gets printed w ong edge first.)

It might be thought that documents could not be received and printed as fast as they otherwise could with the page reorientation processing. The reason for this is that all of the incoming data is stored in the memory, and then it is read out for printing purposes. Because the printing does not take place simultaneously with the transmission at the other end of the line, there is necessarily a delay. Unless a pair of memories is used, with one being read while the other is being written, while the printer 20 is operating, controller 12 must send a signal to the transmitting machine to tell it to wait before transmitting another document because memory 14 is still in use.

However, this is not the case, and additional memory is not required. As soon as data is read out of any memory location for printing purposes, new data can be stored in that location. Thus the transmitter can immediately transmit another document almost as soon as it finishes transmitting the first. If the character recognition software determines that the data must be read out of memory 14 in the reverse order, as depicted in FIG. 3, then the next document simply has to have its data stored in reverse order—with the first arriving data being stored in memory at a location which maps to the lower right of the documents depicted in FIGS. 2 and 3. Once the data is stored in the memory, the character recognition software does not care whether it was originally stored in the normal or the reverse order. Once it recognizes a page orientation, it controls read-out of the data using one of the two scanning sequences shown in FIGS. 2 and 3.

Although the invention has been described with reference to a particular embodiment, it is to be understood that this embodiment is merely illustrative of the application of the principles of the invention. For example, a machine might reorient pages prior to transmission, in which case no reorientation would be needed upon receipt. (This embodiment, however, is not preferred because misorientated pages would result unless transmissions from all machines are uniformly reoriented.) Thus it is to be understood that numerous modifications may be made in the illustrative embodiment of the invention, and other arrangements may be devised without departing from the spirit and scope of the invention.

What I claim is:

1. A facsimile machine for printing received documents with their corresponding edges aligned comprising a memory, means for storing in said memory data representative of a received document, means for processing said stored data to determine whether the document represented by said data had its top or bottom edge transmitted first, printing means, means for reading data out of said memory to control said printing means to print a document, and means for determining whether the data is read out of said memory in the order in which it was stored or the reverse order in accordance with the operation of said processing means so that all of the documents printed have their corresponding edges aligned.

2. A facsimile machine for printing received documents with their corresponding edges aligned comprising a memory, means for storing in said memory data representative of a received document, printing means, means for reading data out of said memory to control said printing means to print a document, and means for controlling the data to be read out of said memory either in the order in which it was stored or the reverse order so that all of the documents printed have their corresponding edges aligned.

3. A facsimile system for controlling printed received documents to have their corresponding edges aligned comprising means for printing a document in accordance with received data, and means for processing said data to determine the order in which said data is used by said printing means so that all of the documents printed have their corresponding edges aligned.

4. A method for operating a facsimile machine comprising the steps of storing in a memory data representative of a received document, processing said stored data to determine whether the document represented by said data had its top or bottom edge transmitted first, reading data out of said memory to control printing of a document, and determining whether the data is read out of said memory in the order in which it was stored or the reverse order in accordance with said processing so that all of the documents printed have their corresponding edges aligned.

5. A method for operating a facsimile machine comprising the steps of storing in a memory data representative of a received document, reading data out of said memory to control printing of a document, and controlling the data to be read out of said memory either in the order in which it was stored or the reverse order so that all of the documents printed have their corresponding edges aligned.

6. A method for operating a facsimile system comprising the steps of printing a document in accordance with received data, and processing said data to determine the order in which said data is used in the printing step so that all of the documents printed have their corresponding edges aligned.

* * * * *